United States Patent
Shamanna et al.

(10) Patent No.: US 6,321,297 B1
(45) Date of Patent: *Nov. 20, 2001

(54) AVOIDING TAG COMPARES DURING WRITES IN MULTI-LEVEL CACHE HIERARCHY

(75) Inventors: Gururaj Shamanna, Hillsboro, OR (US); Chih-Hung Chung, Santa Clara, CA (US); Derek T. Bachand, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/002,898

(22) Filed: Jan. 5, 1998

(51) Int. Cl.[7] .............................. G06F 13/00; G06F 12/08
(52) U.S. Cl. .................. 711/122; 711/128; 711/141; 711/144; 710/52
(58) Field of Search ...................... 711/118, 119, 711/143, 142, 144, 122, 137, 128; 710/52

(56) References Cited

U.S. PATENT DOCUMENTS

| | | | |
|---|---|---|---|
| 5,369,753 | * 11/1994 | Tipley | 711/137 |
| 5,564,034 | * 10/1996 | Miyake | 711/128 |
| 5,860,104 | * 1/1999 | Witt et al. | 711/137 |
| 5,905,997 | * 1/1999 | Stiles | 711/129 |
| 5,918,245 | * 5/1998 | Yung | 711/144 |

OTHER PUBLICATIONS

Jean–Loup Baer and Wen–Hann Wang, "On the Inclusion Properties for Multi–Level Cache Hierarchies," The Computer Society of the IEEE, May 30–Jun. 2, 1988, pp. 73–80, The Computer Society Press.

Brian K. Bray and M.J. Flynn, "Writes Caches as an Alternative to Write Buffers," Apr. 1991, Technical Report No. CSL–TR–91–470, Computer Systems Laboratory, Stanford University.

* cited by examiner

Primary Examiner—Glenn Gossage
(74) Attorney, Agent, or Firm—Blakely, Sokoloff, Taylor & Zafman LLP

(57) ABSTRACT

A method and apparatus for avoiding tag compares when writing to a cache. In a cache hierarchy, location information of the cache entries are linked and supplied to the other caches, during caching of the data from memory. When the processor is ready to update the content of the memory location, the location information loaded into a write buffer allows the write buffer to update the cache(s), without the need for tag comparisons to determine if particular entries are present. The avoidance of the tag compare operation during cache update saves a clock cycle, so that overall processor performance is improved.

17 Claims, 8 Drawing Sheets

40

| L0 VALID BIT | L1 VALID BIT |
|---|---|
| 0 | 0 |
| 0 | 1 |
| 1 | 1 |

| L0 VALID BIT | L1 VALID BIT |
|---|---|
| 0 | 0 |
| 1 | 0 |
| 0 | 1 |

Fig. 9

AVOIDING TAG COMPARES DURING WRITES IN MULTI-LEVEL CACHE HIERARCHY

BACKGROUND OF THE INVENTION

1. Field of the Invention

The present invention relates to the field of processors and, more particularly, to a technique for utilizing cache memory.

2. Background of the Related Art

The use of a cache or caches with a processor (whether integrated within the processor chip or external to it) is well known in the computer art. A primary purpose of using caches is to enhance processor performance by reducing data access time. It is generally understood that memory devices closer to the processor operate faster than memory devices farther away on the data path from the processor. However, there is a cost trade-off in utilizing faster memory devices. The faster the data access, the higher the cost to store a bit of data. Accordingly, a cache memory tends to be much smaller in storage capacity than main memory, but is faster in accessing the data.

Current generation high performance computer systems will utilize multiple caches, typically arranged in a hierarchical arrangement of cache levels. A processor of a computer system maintains cache coherency by updating all the caches simultaneously or by updating the different cache levels at various times. For example, in a write-through cache system, a write operation simultaneously updates the cache and the main memory or the next level cache in the hierarchy. If all of the caches are write-through caches, then all of the caches and the main memory can be updated simultaneously. In a write-back cache system, a write operation updates only the closest cache. The other cache level(s) and the main memory can be updated at a later time, such as when a cache line is evicted (victimized). Accordingly, there may not be data consistency between the main memory and the cache in a write-back cache.

The use of write-through and write-back caches are known in the art, along with the various cache line allocation and de-allocation schemes for accessing the cache memories. It is also understood that the caches can be inclusive, partially inclusive or exclusive, as pertaining to data storage in the cache hierarchy. A cache hierarchy is inclusive if a cache at a given level is a subset of a cache at a higher level of the hierarchy. A data request by a processor is typically satisfied by the closest cache level that contains the data. Lower in the hierarchy is defined as those levels closer to the processor. A cache is exclusive if cached data in one level does not exist in any other level. A partially inclusive cache implies that the data at a given cache level is not a full subset of a higher cache level. Generally in practice, most cache systems implement a partially inclusive cache structure.

One notable aspect of cache memory is the use of address tags to identify cache lines present in a cache. An address tag is a subset of the actual address. The number of bits in the tag is determined by the number of sets in the cache and also the cache line size. A cache line includes the tag, information (or data) and state (or status) bit(s), which provide certain state (or status) information pertaining to the cached line. For example, state bits are used to identify if the cache line is dirty (been modified), is shared by other resources, is invalid or is exclusive to one resource.

Since each cache line stores multiple bytes of data, the tag corresponds to the beginning address of the group of data in memory which are now stored in the cache. Accordingly, the cached data is a replication of the data stored in the main memory.

Whenever a read instruction requiring data retrieval from memory is executed, the processor generates an address for accessing that memory location to retrieve the data. This read address is then presented to the cache. A particular set is accessed and tags present in the different ways in the set are compared with the read address. If the compare operation is successful, data is provided to the processor. If the compare operation is unsuccessful, data is retrieved from external memory and loaded into the cache and also forwarded to the processor. If the same data is needed again, then data is retrieved from the cache instead of the main memory.

Likewise, when a write is executed by the processor, the processor will need to update the cached data, either prior to or simultaneously with the updating of the main memory. In a write operation from the processor, a cache is accessed to determine if the tag for that address is present in the cache, so that the cached data can be loaded into a write buffer. If data had not been cached, then the data is retrieved from the main memory and loaded into the cache(s) and the write buffer, similar to a read operation. Next, the data in the write buffer entry is updated with the store data. Subsequently, the modified data in the write buffer is written to the appropriate location(s) in the cache(s) and/or the main memory. It should be noted that the cache cannot be updated directly with the store data due to significant implementation difficulties.

In order to determine the presence of a particular address tag in a cache corresponding to the address associated with the data which is to be written, tag compares are performed at the cache levels. A tag comparison determines if there is a "hit" or a "miss" at a given cache level. A subtle but important point to be observed is that one tag compare operation is performed during a read and two tag compare operations are performed during a write operation..

In a typical tag comparison operation, some amount of time is needed to perform the comparison. Typically, at least a full clock cycle is required to read the tags and compare them to the address to determine if a cache line associated with the address is present in the cache. A mechanism that avoids the need for this tag compare operation when updating the cache line would save significant amount of time, thereby improving processor performance. The present invention provides for such a scheme in which tag compares during a write operation to modify an existing cache line is avoided, in order to improve processor performance. That is, the practice of the present invention reduces the required tag comparisons during a write to one tag compare operation, instead of two.

SUMMARY OF THE INVENTION

The present invention describes a technique for avoiding tag compares when writing to a cache. Instead of comparing the address to tags in a cache to determine if a hit will result in the cache during a cache update, the present invention provides location/way information of the cache line to be supplied to the processor's write buffer so that the cache line can be updated directly without performing a tag compare. The avoidance of the tag compare operation during a cache write phase saves a clock cycle so that overall processor performance is improved.

When data is originally loaded from the main memory and cached into the various caches of the cache hierarchy, location information as to which "way" the particular data has been cached is noted and transmitted down the hierarchy and linked in the various caches. The location information is transferred to the write buffer when data is loaded into the write buffer from the cache for modification. Now the cache line can be updated directly with the write buffer contents, without performing a tag compare, since the location/way information of the cache line is presently stored in the write buffer.

In the preferred embodiment, valid bits are used in the write buffer to indicate that the location/way information is incorrect if the original cache line had been victimized. This ensures that the location information in the write buffer does not update the cache location, if the location no longer contains the original entry. The present invention also has the various cache levels independently maintain location information of caches higher in the hierarchy, so that information is available at each of the cache levels independent of the write buffer. This allows cache updates to be performed at a later time from the buffer update.

BRIEF DESCRIPTION OF THE DRAWINGS

FIG. 8 shows a truth table for valid bits of the buffer of FIG. 6 when the two-level cache hierarchy of FIG. 7 is employed as fully inclusive caches.

FIG. 9 shows a truth table for valid bits of the buffer of FIG. 6 when the two-level cache hierarchy of FIG. 7 is employed as exclusive caches.

DETAILED DESCRIPTION OF THE INVENTION

A technique for avoiding tag compares when writing data into a cache in a multiple level cache hierarchy is described. In the following description, numerous specific details are set forth, such as specific cache memories and structures, block diagrams, and example operations, etc., in order to provide a thorough understanding of the present invention. However, it will be appreciated by one skilled in the art that the present invention may be practiced without these specific details. In other instances, well known techniques and structures have not been described in detail in order not to obscure the present invention.

Figure 1:
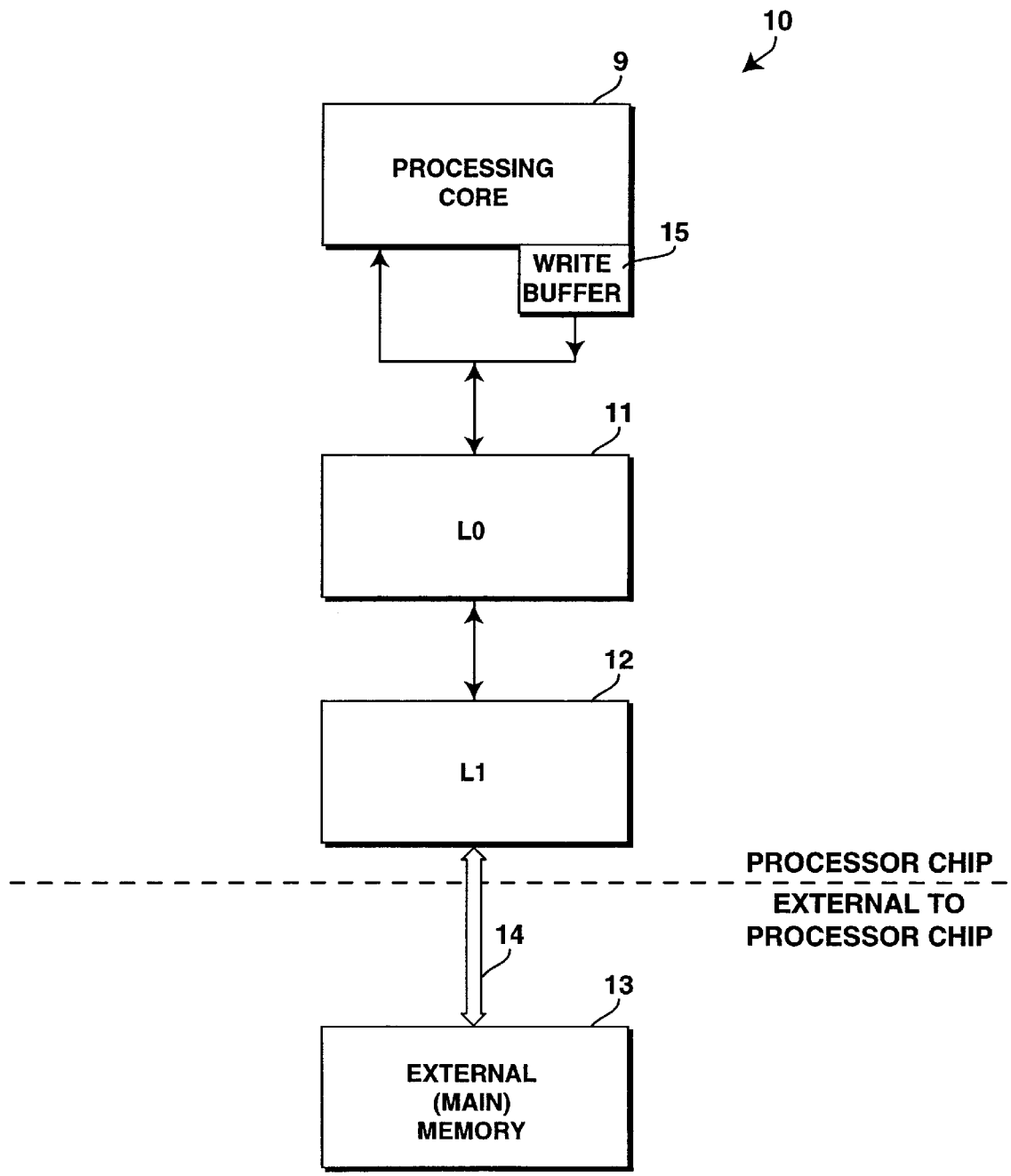
FIG. 1 shows a processor core, two cache levels and an external memory.

Referring to FIG. 1, an example of a cache memory system 10 in which the present invention operates is illustrated. The particular cache memory system 10 is a hierarchical cache system having two cache levels. In a typical hierarchical cache arrangement known in the art, a plurality of cache memories are arranged in levels, with the level closest to the processor labeled as Li. Subsequent levels of cache are respectively labeled L(i+1). It is generally understood that cache hierarchies are utilized in a computer system.

In FIG. 1, the exemplary system 10 is shown having two levels of cache 11 and 12, wherein the level 0 (L0) cache 11 is closest (in terms of data access) to a processing core 9 and is accessed first by the processing core 9. That is, the first level cache 11 is the Li cache, where i=0. The next level cache is the level 1 (L1) cache 12, which is situated farther away from the processor, in data processing terms. In some systems, the terminology L0 is not used for the cache closest to the processor. Instead, the first level cache is the L1 cache. In these systems, the second level cache is the L2 cache. The actual designation is not critical to the practice of the present invention.

In the example of system 10, a memory 13 is then coupled to the L1 cache 12. Memory 13 can be of one of a variety of storage devices, but generally in the current processing environment, memory 13 is a main memory of a computer system. Memory 13 is also referred to as RAM, since random-access-memory (RAM) storage devices generally are used as the main memory in a computer system. Although not shown, it is to be noted that other memories (such as magnetic or optical media), peripherals, modems, networks, as well as information routed through the Internet can be coupled to the computer system for information transfer to and from the processing core 9.

In the particular example, the L0 cache is resident physically close to the processing core and is typically resident on the processor chip itself. The L1 cache of FIG. 1 also resides on-chip. However, it is understood that the L1 cache (or both the L0 and L1 caches) can reside on a separate chip, such as a cache memory chip, generally used with a processor chip in a computer system, which is generally known today as a PC. Again, the actual placement of the various cache memories is not critical to the practice or understanding of the present invention. Furthermore, only two levels of cache are shown in the example, however, it is to be noted that additional levels of cache memories can be present. Current practice is to have one, two or three levels of cache memories in a computer system.

Since the L0 and L1 caches reside on the processor chip, the main memory 13 is shown referred to as an external memory and coupled to the processor by a bus 14. The dotted-line distinguishes the separation of the processor chip from its external environment. For definition purposes, the L0 cache is at the lower most level of the cache hierarchy and the main memory 13 is at the highest level. Furthermore, a write buffer (also referred to as a write-out-buffer) 15 is coupled to the processing core 9 for use in storing information when a write is issued by the processing core 9. For ease of discussion, the processing core 9 is hereinafter referred to simply as the processor 9 and is treated separately from the buffer 15 and caches 11–12. However, it is appreciated that one or some or all of these components can reside on a single chip commonly referred to as a microprocessor and, in general practice, one or two levels of cache are on the processor chip itself. Also, information being transmitted between the processor 9 and memory 13 can be data or instruction, but is referred to simply as data hereafter.

The cache memory system 10 of FIG. 1 can be configured as a write-back cache, a write-through cache, or as a variation of the two. The concepts and operations of write-back and write-through caches are known in the art. Also known are the various protocols associated with the allocation and de-allocation of cache lines, as well as the use of associative cache structures. It is also known that most aches operate set-associative, in which a cache is organized to have m-ways for each set.

Figure 2:
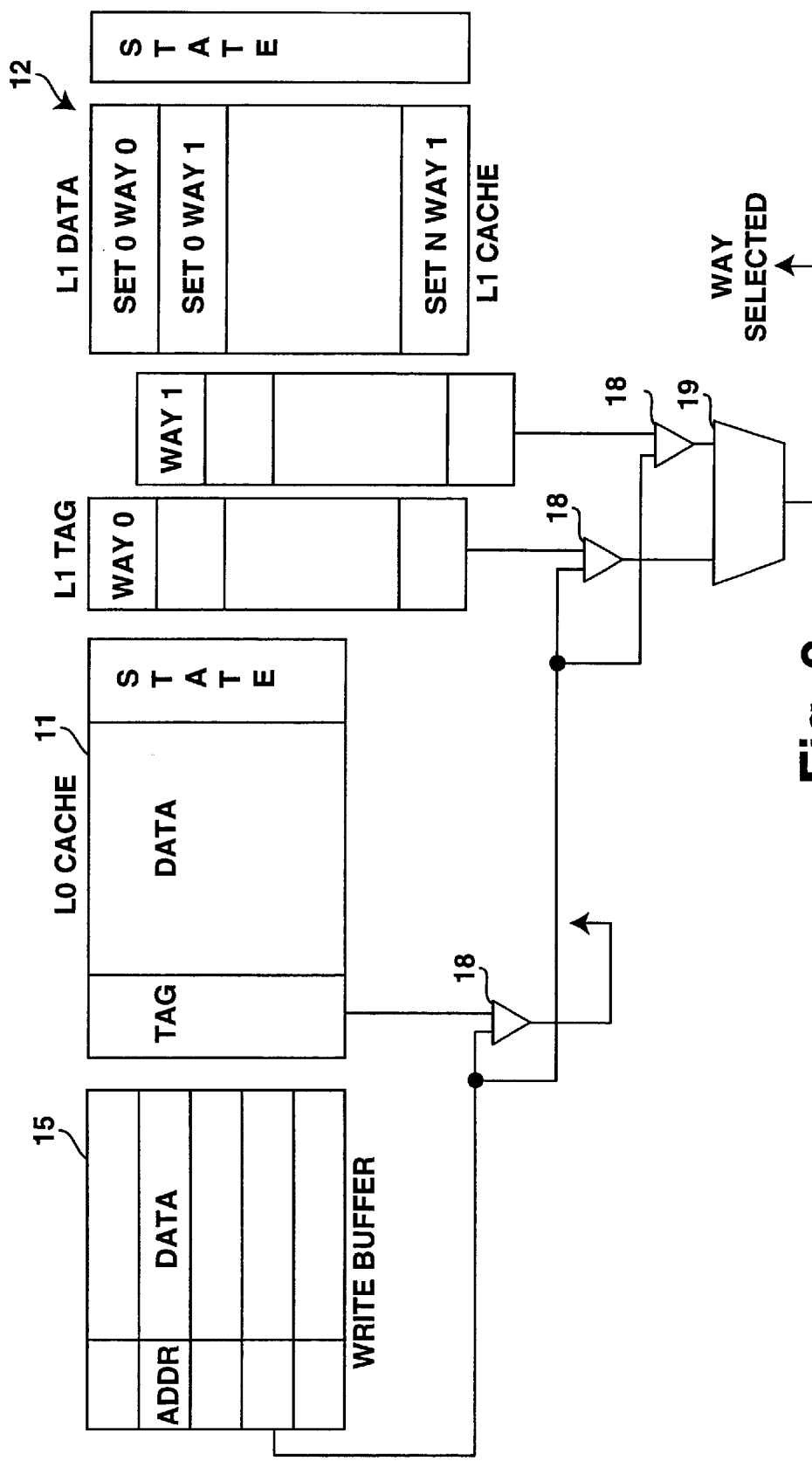
FIG. 2 shows a write buffer and the two levels of cache, including the expansion of the second level cache into its components, when a prior art technique of performing a tag comparison is utilized for the two-level cache structure shown in FIG. 1.

FIG. 2 illustrates the prior art technique of using a tag compare operation on a two level cache hierarchy of FIG. 1. As shown in the Figure, a cache line is generally comprised of an address tag (tag), data and a state (or status) information. The L1 cache 12 in FIG. 2 is shown further separated into these 3-tuple components. The L1 cache is further shown having a 2-way set associative arrangement, having Way 0 and Way 1 for each of its N sets. The L0 cache 11 is not shown in separate parts, but it is appreciated that it too can be organized into a multiple-way arrangement.

The write buffer 15 is shown having address and data components. The address and data are provided by the processor (again, the term processor actually pertains to the processing core in the discussion) when an instruction causes a write operation to be issued. An example of such an instruction is a store operation in which new (modifying) data is written to main memory. As previously described in the background section, the processor must first load the original data into the allocated write buffer entry, whether that data is obtained from one of the caches or the main memory. The write operation causes a portion of the existing data in the allocated write buffer entry to be replaced by the new data. Then, based on the particular buffer configuration and protocol, the modified data in the write buffer entry is then used to update the cache(s) and/or the main memory.

It is appreciated that even though the original data had been written into a cache previously and further assuming that this data had been accessed from a cache to load the write buffer, the cache line entries still need to be checked to determine if the original data is still present. It is possible that the original data entry may no longer reside in the cache, due to an eviction. Accordingly, when modifying data is to be written into a cache, the cache line entries need to be checked to determine if the address tag corresponding to the modifying data is present in the particular cache and, if so, in which "way" is it present.

As exemplified by comparators 18, the address present in the write buffer 15 is compared to the tags of the cache lines present in the caches to determine if the appropriate tag is resident in a given cache. In the example shown, multiplexer 19 is utilized to select between Way0 or Way1 for the L1 cache. Again, it is appreciated that although only one comparator 18 is shown for the L0 cache, the L0 cache would have equivalent components for multiple comparisons and selection of the appropriate way.

A cache "hit" results when there is a match between the address in the buffer 15 and the corresponding tag in a cache. How the data present in the matched cache line will be used will depend on other factors, such as the information present in the state bits. Using the write operation as an example, the matched cache line is then updated with the data from the write buffer 15. Assuming that both L0 and L1 are write-through caches, the data in the buffer entry will update both the L0 and L1 caches at the same time.

Figure 3:
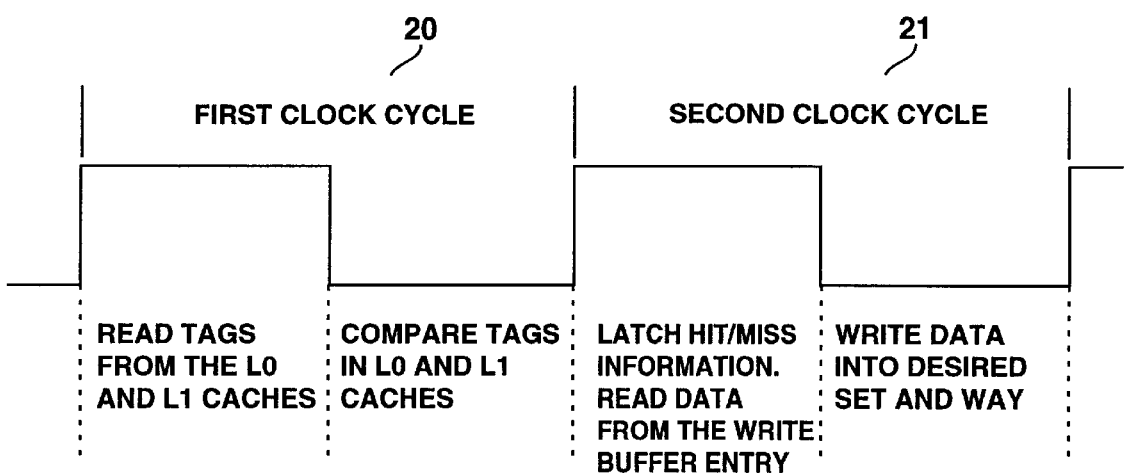
FIG. 3 shows the clock cycles required for reading tags from the cache to make a tag comparison for determining a cache hit to write data into the cache, when tag comparison techniques known in the art are employed.

In order to perform the tag comparisons for the updating of the cache(s), two clock cycles are required. As shown in FIG. 3, a first clock cycle 20 is necessary to read the tags from the caches and perform the tag comparisons. A second clock cycle 21 is then utilized to latch the tag compare results, read the data from the write buffer entry and generate a write enable to write the data into the appropriate way of the cache. Thus, two clock cycles 20 and 21 are needed for updating the caches once the modified (new) data is resident in the write buffer 15. The present invention reduces this cache updating time to only one clock cycle.

Figure 4:
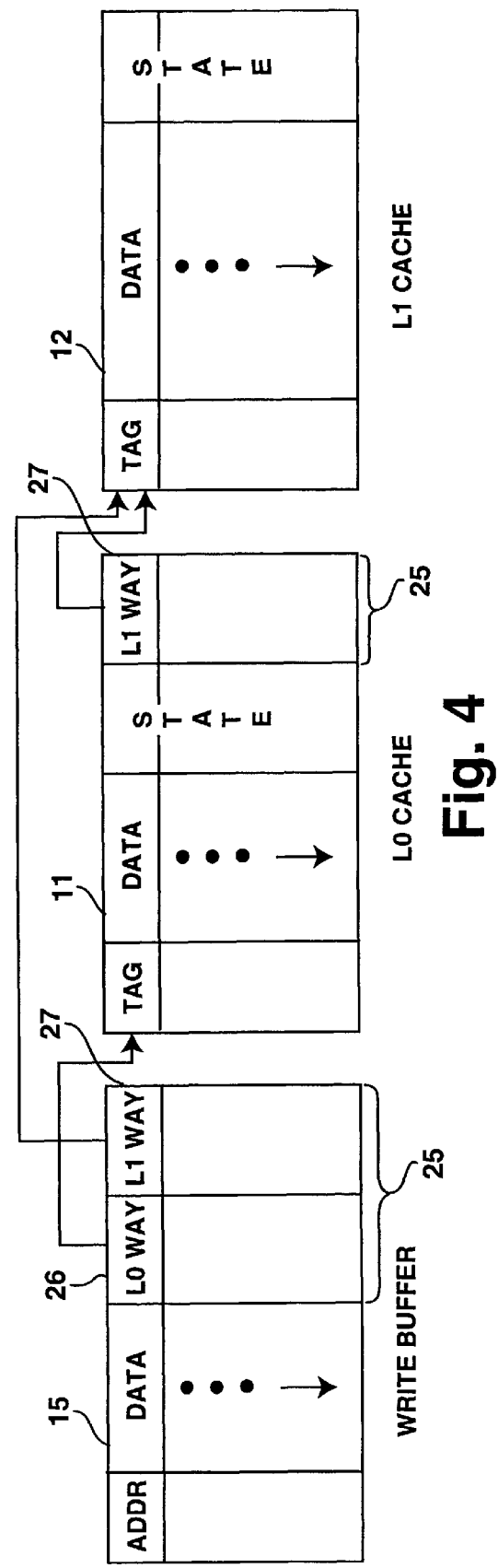
FIG. 4 shows an implementation of the present invention in a two cache hierarchy, such as the one shown in FIG. 1, in which cache location (way) information are transferred down the hierarchy as cache lines are loaded.

Referring to FIG. 4, a basic configuration of a two-level cache hierarchy implementing the present invention is shown. The write buffer 15, the L0 cache 11 and the L1 cache 12 with their component parts are again illustrated, but now with the inclusion of an additional status field 25. The present invention implements this additional status field to identify the location of the corresponding cache line in a cache higher up the hierarchy.

Assume that in the two cache level example, both L0 and L1 caches contain cache line entries corresponding to the address of the line present in the write buffer 15. The status field 25 of the buffer line includes both a L0 location field 26 and a L1 location field 27. The L0 field 26 contains information which identifies the location of the corresponding cache line in the L0 cache 11. Essentially, the information identifies if a tag for the address of the buffer line entry is present in the L0 cache. Likewise, the L1 field 27 contains information which identifies the location of the corresponding cache line in the L1 cache. The information contained in the field 27 identifies if the tag for the same address is present in the L1 cache 12. Thus, the status field 25 for the line entry in the buffer 15 includes location information of the corresponding cache lines in L0 and L1 and therein providing a link of the data to those cache lines in L0 and L1. It is presumed that the two cache lines in the example contain the same tag and data.

Equivalently, the L0 cache includes the L1 location field 27 in its cache line so that a link can be made to the corresponding cache line in L1. The L0 field 26 is not needed, since this is the L0 cache. Accordingly, no such status field 25 is needed in the cache line for the L1 cache, since no cache exists higher than the L1 level. The linking of the L0 and L1 location status fields to the appropriate cache lines are illustrated in FIG. 4. It is appreciated that the status field 25 at each level from the buffer upward includes information about cache level(s) higher up the hierarchy.

The information present in the status field 25 at each level is provided when the data is loaded (cached) into each of the cache memories. That is, when a load (read) operation is executed, the data is originally brought down the hierarchy from the main memory 13. As the data is loaded into the highest level cache (L1 in the example), the location information for that data's cache line is obtained and that information is transferred to the next lower level cache (L0 in the example). Thus, location information for a cache line at a given level, along with the resident location information regarding any higher levels, will be transferred from level to level as the data is loaded into the caches down the hierarchy. The information is linked from cache to cache as the data is loaded into the various caches.

It is also to be noted that the loading of the caches from higher up the hierarchy can also occur with a write instruction. For example, when operating under a write allocate policy, a resulting cache miss will initiate the fetching of the information from higher levels of cache and/or the main memory and this fetched data is also written into the missed caches. Accordingly, as cache lines are allocated at the various cache levels for the entry of the data, the cache line location information is passed down the hierarchy. The location information is stored in the corresponding status fields to provide the link for the cache lines containing the data all the way to the lowest cache level storing the data, as well as to the write buffer.

The location information being stored in the status field 25 is the "way" information where data can be found in each of the caches. The location fields 26 and 27 in FIG. 4 are used to convey the corresponding way where the data can be found in L0 and L1. Thus, the L0 field 26 identifies the way where the data is stored in the L0 cache and the L1 field 27 identifies the way where the data is stored in the L1 cache. Way bits of the way field 26 and 27 are used to designate the particular way which stores the data. The way bits identify the way where the cache line containing the data is located in a given cache level. In a two-way cache, one bit is needed. In a four-way cache, two bits are needed, etc.

Therefore, when the processor initiates a write operation, the caches are first accessed to identify the appropriate tag for loading the existing data into the write buffer 15. If there is a hit, then the existing data, along with the way information, is loaded into the write buffer from the cache having the hit. If a miss occurs, the original data is loaded into the write buffer and/or the caches, as noted above. The tag comparison initiated during this phase of loading the write buffer is equivalent to the prior art technique described earlier. At the conclusion of this phase, the write buffer 15 will contain the address and the existing (old) data. The write buffer 15 will also contain the status field 25 as well, which is obtained from the lowest level cache having that line entry. Thus, for a particular buffer line in the example of FIG. 4, the L0 field 26 and the L1 field 27 entries from the L0 cache are copied into the buffer 15. This information identifies the way information for a cache line existing in the L0 cache and likewise for the L1 cache. Now that this information is readily available to the write buffer, the caches do not need to be interrogated to determine if a corresponding tag is present and in which way it is present.

Figure 5:
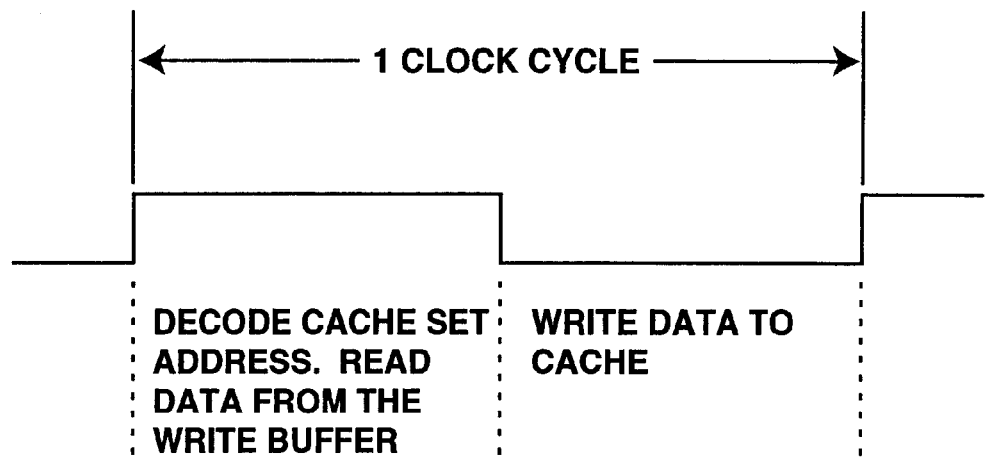
FIG. 5 shows the single clock cycle required of the present invention to write data into a cache, when tag comparison techniques known in the prior art are avoided.

Once the location information is loaded into the write buffer 15, the present invention can be utilized when writing the modified (new) data to the caches. That is, in order to update the cache(s) during the cache update phase, the caches do not need to be checked again to determine if the appropriate tag is still resident. Although the prior art tag comparison technique can be utilized, the use of the present invention improves performance by requiring only one clock cycle. Accordingly, as noted in FIG. 5, only one clock cycle is needed to decode the address and to write the data from the buffer 15 into one or both of the caches with the practice of the present invention. The first clock cycle noted in FIG. 3 for performing the tag comparison is not needed with the practice of the present invention, since the cached locations are already known by the presence of the fields 26 and 27.

Although the invention is operative as shown in FIG. 4, a number of embodiments are described below which can enhance the performance, depending on the type of cache structure utilized. Furthermore, it should be noted that the cache line can be evicted (victimized) between the time the original data is loaded into the write buffer 15 and when the cache line is updated. When this eviction occurs, the cache line no longer contains the original entry and one or more of the location information present in the write buffer is no longer correct for updating the cache(s). Since data correspondence noted in the earlier field entries 25 is no longer correct, the information in the fields 25 will need to be updated. One simple technique to identify this information inconsistency in the cache hierarchy is to utilize a valid bit along with the way information in the write buffer 15.

Figure 6:
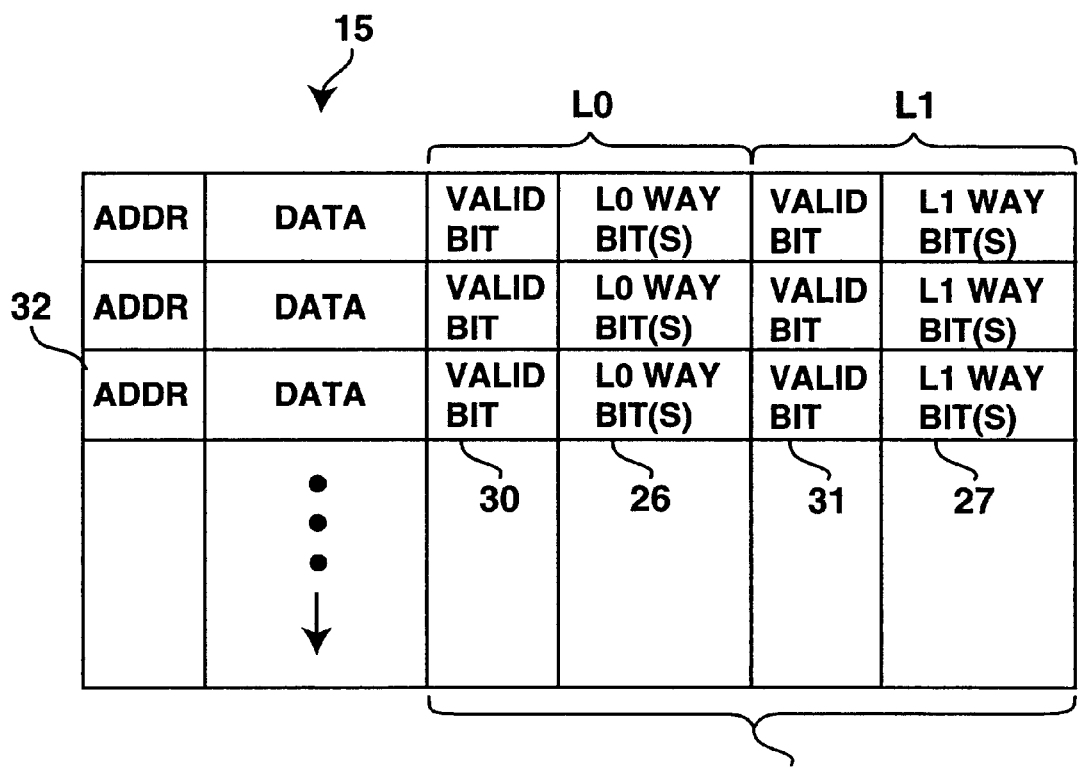
FIG. 6 shows buffer line entries for a write buffer when valid bits are utilized with each cache location information as practiced in the preferred embodiment.

Referring to FIG. 6, the write buffer 15 is illustrated again with L0 and L1 way fields 26 and 27. In this embodiment, a valid bit is associated with each of the way fields in the buffer 15. A valid bit 30 is used to denote if the L0 way field 26 is valid. Likewise, a valid bit 31 is used to denote the validity of field 27 for the L1 way information. Essentially, the valid bit is used to identify whether the corresponding cache line at the particular cache level has maintained data consistency.

The valid bits are initially set when the data is loaded into the caches and the write buffer. In the example of FIG. 6, a corresponding entry (shown as buffer line 32) will contain the address of the loaded data, the data itself, L0 way bit(s) set to identify the cache line location of the same data in the L0 cache, L1 way bit(s) set to identify the cache line location of the same data in the L1 cache and the two valid bits. The two valid bits 30 and 31 are initially set. Then, assume that the corresponding cache line in the L0 cache is evicted, so that the L0 cache line linked to the write buffer 15 no longer corresponds to the tag in the buffer 15. Without some mechanism in place, this error will not be corrected. However, with the preferred embodiment, when the eviction of the L0 cache line occurs, the L0 valid bit 30 in the buffer line 32 is reset (cleared) to indicate that the L0 cache line pointed to by the way bits in field 26 is no longer valid.

If the example invalidation above occurred with the eviction of the L1 cache line in the L1 cache, the L1 valid bit 31 in the buffer line 32 would be reset instead. If both the cache entries had been victimized, then both bits 31 and 32 would have been reset. Thus, the valid bits can be used to determine if data consistency remains in the caches when a write is issued from the processor. Accordingly, when a particular valid bit is reset, the corresponding cache line need not be updated with the write buffer data since the corresponding tag is no longer present in that cache.

Figure 7:
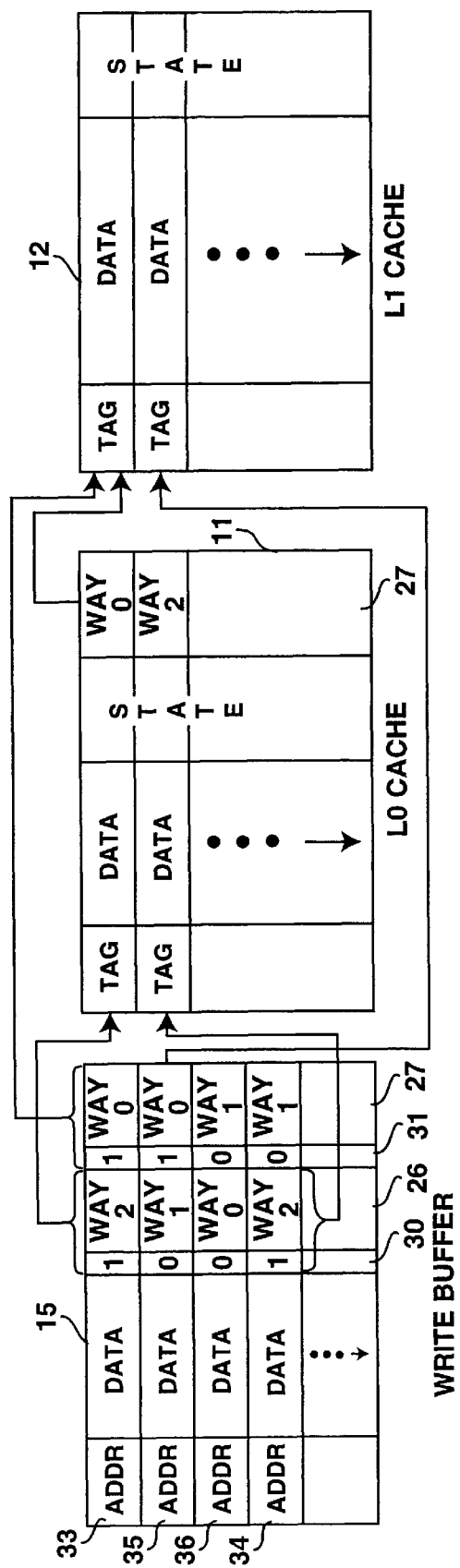
FIG. 7 shows an example of implementing the buffer of FIG. 6 in the two-level cache hierarchy and the usage of the valid bits being specifically suited for partially inclusive caches.

The above examples are illustrated in more detail in FIG. 7. Hypothetical entries are noted for the valid and way bits in FIG. 7. A buffer line 33 indicates that both of the valid bits are set to "1", indicating that there is an buffer address match with the tags in the L0 and L1 caches. The way bits indicate that the tag is at way 2 in L0 and at way 0 in L1. Note that the way information for L1 is also resident in the L0 cache.

The example of the buffer line 33 is equivalent to address-tag comparisons resulting in cache hits at both levels of the cache when tag comparisons are employed under the prior art practice. Other examples are shown as well. A buffer line 34 shows that there is a tag match in L0, but that the original entry in L1 at way 1 has been invalidated. This indication is equivalent to an address-tag match comparisons resulting in a hit at L0, but a miss at L1. The other buffer lines 35 and 36 indicate the other two combinations which could result. These are, L0 miss/L1 hit and L0 miss/L1 miss conditions. Note that where the valid bit has a value of 0 (reset value), there are no links to cache lines in the caches.

In operation, when the processor issues a write (such as a store operation that writes data to memory), the store data for the address is placed into the appropriate buffer line entry containing that address. That is, a portion of the existing data is replaced by the store (new) data. Usually, the length of the store data is less than the length of the cache line (a cache line length will be some multiple of the store data length). Hence, only a portion of the cache line/write buffer contents will be modified.

Since the L0 and L1 fields 26 and 27 are present, they are used to identify the appropriate cache line in each of the caches that contains the original data. The valid bit in the buffer for each cache is checked to determine if the cache line is still valid. If the entry is still valid, then the noted cache entry is updated with the new data. That is, the new data is written into the cache line.

If a valid bit is reset, it indicates that the cache line has been evicted and that particular cache line is not updated. The buffer will update the other cache, provided the valid bit for that cache is set. It is to be noted that the cache containing the invalid entry can still be updated with the new data (such as when employing a write allocate policy), but this would be treated as a new entry when a cache miss occurs in a write operation. The procedure will depend on the protocol utilized for cache misses.

The use of a valid bit for each cache level provides for a general technique for identifying invalidation (reset state) in each of the caches. The example as illustrated in FIG. 6 is functional with various cache arrangements. It is applicable for use in partially inclusive cache structures, where a cache at a particular level is not a complete subset of another cache at a higher level. As shown in FIG. 7, there are four possible combinations of the L0/L1 valid bits (00, 01, 10 and 11) to designate the four possible states of the L0 and L1 caches. The configuration shown in FIG. 7 is the general case, when practicing the present invention.

In an alternative scheme to the implementation of the buffer structure of FIG. 6, the caches can be configured to operate fully inclusive (the condition when the lower level cache is a complete subset of a higher level cache). That is, all of the cache lines of the L0 cache are also present in the Li cache. In this instance, if a particular cache line, present in both the L0 and L1 caches, is evicted from the L1 cache, then both the L0 and L1 valid bits 30 and 31 are reset. This is done to maintain the fully inclusive property of the caches. However, if the line had been evicted from the L0 cache, then only the L0 valid bit 30 is reset. A truth table 40 in FIG. 8 illustrates the three possible conditions. The condition L0 valid/L1 invalid (10) cannot occur since the caches operate fully-inclusive.

Still another alternative scheme to the implementation of the buffer structure of FIG. 6, the caches can be configured for operating as exclusive caches (the condition when the lower level cache is a null set of a higher level cache). That is, the cache lines of the L0 cache are not present in the L1 cache. In this instance, if a particular cache line present in the L0 cache is evicted, it has no impact on the L1 cache. Similarly, any eviction from the L1 cache does not impact the L0 cache. In the two-level example, a given cache line can exist either in L0 or L1, but not both. Accordingly, for a given cache line, only one of the valid bits 30 or 31 would be set. This is done to maintain the exclusive property of the caches. A truth table 41 in FIG. 9 illustrates the three possible conditions. The condition L0 valid/L1 valid (11) cannot occur since the caches operate exclusively. It should also be noted that the way information need not be retained in each of the cache levels linking the caches, since exclusive caches do not have such links. Thus, for the L0 cache in FIG. 7, the L1 way information need not be retained therein.

The various applications of the present invention are illustrated by the example structure of FIG. 7, in which the buffer (shown in detail in FIG. 6) can be configured to operate using the truth tables noted in FIGS. 7–9. The particular implementation will depend on the particular cache structure and whether the structure employs a write-through cache, write-back cache or some hybrid of the two. Generally, where the data in the write buffer would be used to update multiple cache levels (which would be done with write-through caches), the present invention is more applicable, since avoidance of tag comparison delay would improve processor performance. Where write-back caches are used, tag comparisons do not necessary impact processor performance, since the higher level caches are updated at a later time from the buffer update of the first cache level. In this instance, the present invention can be implemented only for the initial cache level. However, since links to the caches at higher levels are present in the cache line at a given level, the updating to the higher level can be performed at a later time (and not necessarily simultaneously with the buffer write) by using the location information present in the cache. Accordingly, a multitude of variations are possible for implementing the present invention into practice.

Figure 10:
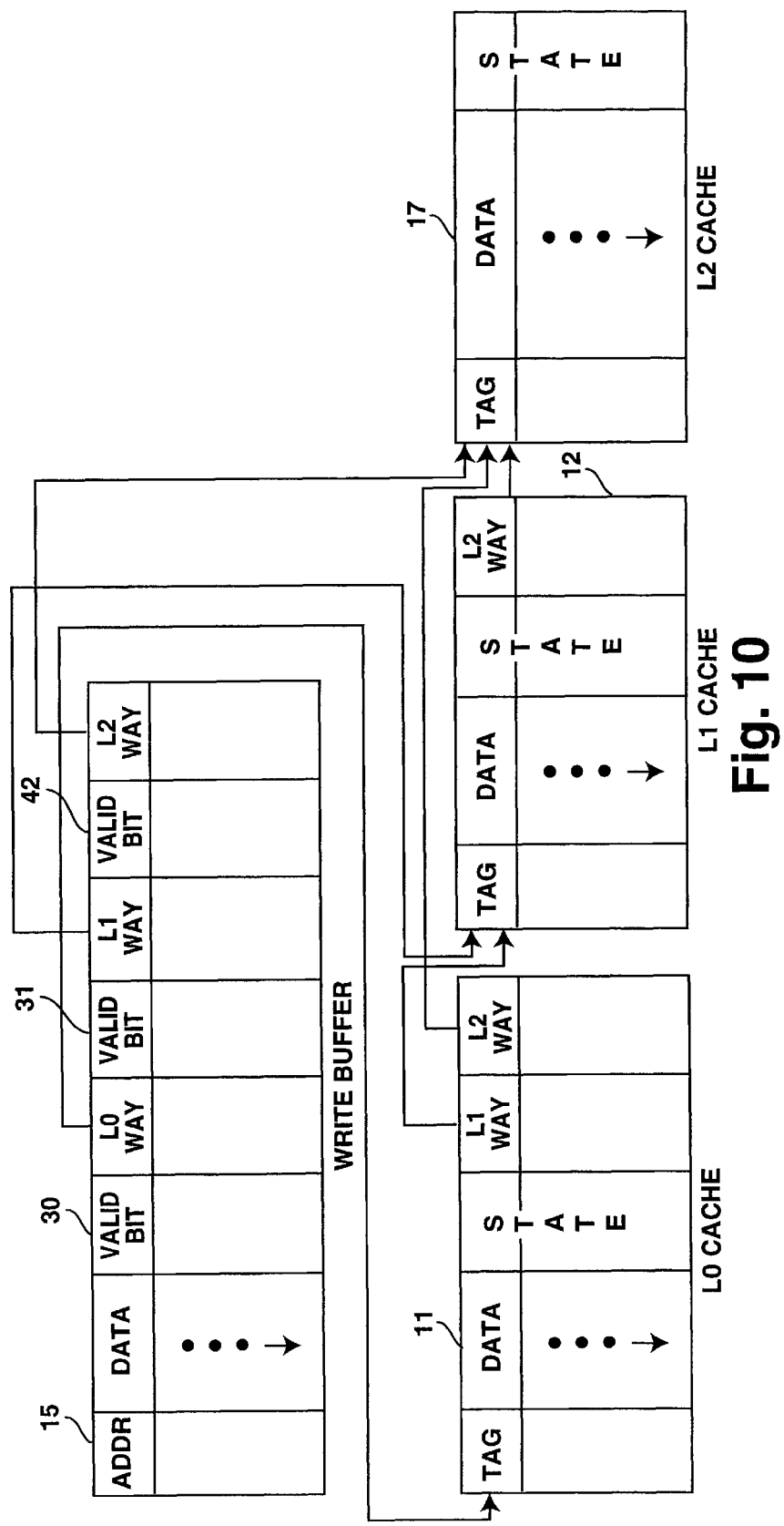
FIG. 10 shows an application of the present invention when extended into a three-level cache hierarchy.

Furthermore, as shown in FIG. 10, the invention can be utilized in cache hierarchies of more than two levels. The earlier examples only described two levels of cache (L0 and L1) for simplicity of description. The example of FIG. 10 shows the extension of the cache/buffer structure of FIGS. 4 and 7 to include a third level cache. The additional L2 cache 17 is the highest cache level. Accordingly, the way (location) information for the cache line of L2 is passed down the hierarchy and retained by the L1 and L0 caches and provided to the write buffer 15. Cache L1 now contains the L2 location information and cache L0 contains L1 and L2 location information. All three locations are contained in the write buffer 15, along with their valid bits. A valid bit 42 is employed in the buffer 15 for the L2 level, along with valid bits 30 and 31 (for the L0 and L1 levels).

As noted, the discussion pertaining to the partially inclusive, fully inclusive and exclusive cases apply as well to the three-level example. The truth tables for the valid bits will now incorporate the third valid bit 42 and the possible combinations will depend on the particular cache structure being implemented. Likewise, the number of cache levels can be extended beyond the third level to include additional cache levels. Furthermore, the caches need not be strictly in the vertical hierarchy arrangement and could be utilized in the horizontal direction of the hierarchy as well.

Also, the present invention can be utilized effectively as well in a single level cache arrangement. Although most current generation state-of-the-art systems implement multiple caches, the invention can be employed in a single level cache (or only at a single level in a multiple level cache system) and still provide enhanced processing.

Accordingly, by the practice of the present invention, tag comparisons are avoided at the cache levels during cache update, so that the processor utilizes less clock cycles than the prior art in updating the cache or caches. The avoidance of the tag comparison step can result in improved performance for the processor and/or the computer system. Thus, tag compares are avoided to update a cache memory in a computer system.

We claim:

1. An apparatus comprising:
    a plurality of cache memories arranged into a cache hierarchy to cache data resident at a storage location accessed by a processor, each of said plurality of cache memories having a separate location field for every other of said plurality of cache memories that is higher in the cache hierarchy than said each of said plurality of cache memories, wherein at least one of said plurality of cache memories has a cache line containing an address tag corresponding to an address of said storage location, said cache line also having said data stored therein;

a write buffer coupled to said processor and at least one of said cache memories and having resident therein new data which is to be written from said processor to said storage location and also to said cache line, if said address tag corresponding to said address of said storage location is present in said at least one of said cache memories; and said write buffer also including with said new data, location information as to where in said at least one of said cache memories said address tag is located if said address tag is present in said at least one of said cache memories, said location information having been retrieved from said at least one of said cache memories in response to a cache access;

wherein said write buffer includes a separate field for each of said at least one of said cache memories to store said location information;

wherein said location information in said write buffer eliminates a need for a tag compare to write said new data to said at least one of said cache memories.

2. The apparatus of claim 1 wherein said location information is comprised of bits to identify in which way of a cache said data is stored.

3. The apparatus of claim 2 wherein said location information in said write buffer also includes a valid bit to identify if said cache line containing said data is no longer a valid entry.

4. The apparatus of claim 2 wherein said location information in said write buffer also includes a plurality of valid bits, wherein a separate valid bit is used for each cache level of the hierarchy to identify if said cache line containing said data for that cache level is no longer a valid entry.

5. The apparatus of claim 2 wherein said cache hierarchy is arranged as an exclusive cache.

6. The apparatus of claim 2 wherein each of said cache memories also contains location information of all other cache memories containing said data and located in the cache hierarchy further from said processor.

7. The apparatus of claim 6 wherein said cache hierarchy is arranged as a partially inclusive cache or as a fully inclusive cache.

8. A computer system comprising:
a processor;
a main memory coupled to said processor;
a plurality of cache memories coupled to said processor and said main memory and arranged into a cache hierarchy to cache data resident at a storage location of said main memory accessed by said processor, each of said plurality of cache memories having a separate location field for every other of said plurality of cache memories that is higher in the cache hierarchy than said each of said plurality of cache memories, wherein at least one of said plurality of cache memories has a cache line containing an address tag corresponding to an address of said storage location, said cache line also leaving said data stored therein;

a write buffer coupled to said processor, said main memory and said cache memories to have resident there new data to be written from said processor to said storage location, and also to be written to said cache line if said address tag corresponding to said address of said storage location is present in said at least one of said cache memories; and said write buffer also including with said new data, location information as to where in said at least one of said cache memories said address tag is located if said address tag is present in said at least one of said cache memories, said location information having been retrieved from said cache memories in response to a cache access;

wherein said write buffer includes a separate field for each of said at least one of said cache nemories to store said location information;

wherein said location information in said write buffer eliminates a need for a tag compare to write said new data to said at least one of said cache memories.

9. The computer system of claim 8 wherein said location information is comprised of bits to identify in which way of a cache said data is stored.

10. The computer system of claim 9 wherein said location information in said write buffer also includes a valid bit to identify if said cache line containing said data is no longer a valid entry.

11. The computer system of claim 9 wherein said location information in said write buffer also includes a plurality of valid bits, wherein a separate valid bit is used for each cache level of the hierarchy to identify if said cache line containing said data for that cache level is no longer a valid entry.

12. The computer system of claim 9 wherein said cache hierarchy is arranged as an exclusive cache.

13. The computer system of claim 9 wherein each of said cache memories also contains location information of all other cache memories containing said data and located in the cache hierarchy other from said processor.

14. The computer system of claim 13 wherein said cache hierarchy is arranged as a partially inclusive cache or as a fully inclusive cache.

15. A method comprising:
initiating a write operation by accessing at least one cache memory of a plurality of cache memories in a cache hierarchy, each of said plurality of cache memories having a separate location field for every other of said plurality of cache memories that is higher in the cache hierarchy than said each of said plurality of cache memories;

determining there was a hit when accessing said at least one cache memory;

loading location information from the at least one cache memory into a first location field of a plurality of location fields in a write buffer of a processor, each of said plurality of location fields corresponding to a separate one of said plurality of cache memories in said cache hierarchy;

issuing a write from said processor to update an address location in main memory by loading a data field of said write buffer with new data; and updating said at least one cache memory without a tag comparison by using said location information from said write buffer to identify a location in said at least one cache memory to update with said new data.

16. The method of claim 15, wherein said loading location information includes loading way information indicating a location of the hit 17. The method of claim 15, wherein:
said at least one cache memory includes first and second cache memories;

said determining there was a hit includes determining there was a first hit in the first cache memory and a second hit in the second cache memory; and said loading location information includes loading first way information on the first hit into a first location field of the write buffer and loading second way information on the second hit into a second location field of the write buffer.

* * * * *